US008740496B2

(12) United States Patent
Allen

(10) Patent No.: US 8,740,496 B2
(45) Date of Patent: Jun. 3, 2014

(54) CONDUIT FOR PERVIOUS PAVEMENT

(71) Applicant: JJA Engineering, LLC, Minooka, IL (US)

(72) Inventor: Jeffrey J. Allen, Minooka, IL (US)

(73) Assignee: JJA Engineering LLC, Minooka, IL (US)

( * ) Notice: Subject to any disclaimer, the term of this patent is extended or adjusted under 35 U.S.C. 154(b) by 0 days.

(21) Appl. No.: 13/929,015

(22) Filed: Jun. 27, 2013

(65) Prior Publication Data

US 2014/0017008 A1  Jan. 16, 2014

Related U.S. Application Data

(63) Continuation-in-part of application No. 13/856,942, filed on Apr. 4, 2013, and a continuation-in-part of application No. 13/547,580, filed on Jul. 12, 2012, now Pat. No. 8,496,396.

(51) Int. Cl.
*E04C 5/10* (2006.01)
*E04C 5/16* (2006.01)
*E04B 1/41* (2006.01)

(52) U.S. Cl.
USPC .............. 404/36; 404/45; 404/135; 52/405.3; 52/576; 403/364

(58) Field of Classification Search
USPC ............. 52/405.3, 576, 577, 600, 649.1, 676; 404/2, 3, 36, 45, 135, 136; 403/359.1, 403/364; 405/20, 302.4, 302.6
See application file for complete search history.

(56) References Cited

U.S. PATENT DOCUMENTS

| 4,388,015 | A  | * | 6/1983  | Honegger ......................... 404/2 |
| 5,400,561 | A  |   | 3/1995  | Metten |
| 6,168,213 | B1 | * | 1/2001  | Muller .......................... 285/391 |
| 6,585,449 | B2 | * | 7/2003  | Chen ................................ 404/2 |
| 6,962,463 | B2 | * | 11/2005 | Chen .............................. 404/75 |
| 6,962,464 | B1 | * | 11/2005 | Chen .............................. 405/43 |
| 7,004,671 | B2 | * | 2/2006  | Tawara et al. ................. 403/341 |

(Continued)

FOREIGN PATENT DOCUMENTS

SU  1093776 A  5/1984

OTHER PUBLICATIONS

International Search Report for PCT/US2013/050079 dated Nov. 28, 2013.

(Continued)

*Primary Examiner* — Gary Hartmann
(74) *Attorney, Agent, or Firm* — McDermott Will & Emery LLP

(57) ABSTRACT

A conduit for the formation of pervious pavement includes a first connector and a second connector joinable to the first connector. The first connector includes a pair of first receiving notches. The second connector includes a pair of second receiving notches oriented perpendicular to the first receiving notches. When the first and second connector are joined to one another, the pair of first receiving notches cooperates with the second connector to define a pair of first attachment openings for receiving a first structural member of a reinforcing mesh, and the pair of second receiving notches cooperates with the first connector to define a pair of second attachment openings for receiving a second structural member of the reinforcing mesh. First and second tubes are inserted into the first and second connectors to complete the conduit assembly.

20 Claims, 10 Drawing Sheets

(56) References Cited

U.S. PATENT DOCUMENTS

| | | | |
|---|---|---|---|
| 7,300,077 B2 * | 11/2007 | Tawara et al. | 285/417 |
| 7,546,712 B2 * | 6/2009 | Shaw | 52/223.8 |
| 7,731,243 B2 * | 6/2010 | Tiberghien et al. | 285/316 |
| 8,001,725 B2 * | 8/2011 | Lhotak | 49/199 |
| 8,496,396 B1 * | 7/2013 | Allen | 404/36 |

OTHER PUBLICATIONS

Avtomobilnye dorogi i mosty nepreryvno armirovannye tsementobetonnye pokrytiya. Obzornaya informatsiya. Vypusk I. Moskva, 2006.

* cited by examiner

US 8,740,496 B2

CONDUIT FOR PERVIOUS PAVEMENT

CROSS-REFERENCE TO RELATED APPLICATION

This application is a continuation-in-part of U.S. patent application Ser. No. 13/856,942, filed Apr. 4, 2013, which is a continuation-in-part of U.S. patent application Ser. No. 13/547,580, filed Jul. 12, 2012, the entire contents of which are hereby incorporated by reference herein.

TECHNICAL FIELD

The present invention relates generally to a conduit used for the formation of pervious pavement, and more specifically to a multi-piece conduit that can be attached to a reinforcing wire mesh to support the wire mesh and to render the resulting pavement pervious.

BACKGROUND

Standard techniques for making concrete pavement involve pouring liquid concrete over a wire mesh that is suspended above a subgrade surface. The subgrade surface may include gravel, sand, and other materials, depending on the application. The wire mesh reinforces and strengthens the concrete. To prevent water from collecting on the surface of the cured concrete, the concrete must be graded prior to curing so that water flows in a desired direction, often toward a dedicated collection area such as a sewer grate or drain. The process of properly grading concrete requires a skilled hand and can be quite time consuming. Furthermore, the use of dedicated collection areas, particularly when dealing with large areas of pavement, can lead to overflows and backups, and requires a significant amount of additional infrastructure to properly manage the large amounts of collected water.

SUMMARY

The present invention generally provides a pervious pavement. According to one embodiment, a mesh assembly is provided for the formation of the pervious pavement. The mesh assembly comprises a plurality of wires coupled together to form a mesh having a first side and a second side, the plurality of wires defining wire intersections; and, a plurality of conduits coupled to and extending through the mesh, each conduit defining a first opening on the first side of the mesh and a second opening on the second side of the mesh, and surrounding one of the wire intersections such that the wire intersection is located within the conduit.

According to another embodiment, a mesh assembly for the formation of pervious pavement is disclosed. The mesh assembly comprises: a plurality of elongated structural members defining a mesh, the mesh having a first side and a second side; and, a plurality of conduits, each conduit having a first end defining a first opening, a second end defining a second opening, and a passageway extending between the first opening and the second opening, the plurality of conduits coupled to and extending through the mesh, each conduit having at least one of the elongated structural members extending through a sidewall of the conduit, wherein the first opening is positioned on the first side of the mesh and the second opening is positioned on the second side of the mesh.

According to another embodiment, a mesh assembly is provided for the formation of pervious pavement. The mesh assembly comprises: a structural reinforcing mesh having a first side and a second side; and a plurality of conduits formed separately from and non-removably attached to the reinforcing mesh, each conduit having a first portion defining a first opening and positioned on the first side of the mesh, a second portion defining a second opening and positioned on the second side of the mesh, and a passageway extending between the first opening and the second opening.

According to another embodiment, each conduit includes a first end defining the first opening and a second end defining the second opening, wherein the second openings are adapted to be engageable with a subgrade surface and wherein the plurality of conduits include sufficient rigidity to support the mesh a distance above the subgrade surface.

According to another embodiment, a plurality of caps are provided, each cap received by the first opening of a respective one of the plurality of conduits. Each cap includes a ferromagnetic insert for removing the cap from the first opening of the respective one of the plurality of conduits using a magnetic force.

According to another embodiment, a supporting conduit for the formation of pervious pavement may be provided. The conduit may include a first portion having a hollow tubular section, a first portion coupling end, and a first portion distal end. The first portion coupling end may define an opposed and generally axially extending pair of first receiving notches. The first portion coupling end may also include a first latching structure defining one of a male latching member and a female latching member. The conduit may also include a second portion having a hollow tubular section, a second portion coupling end, and a second portion distal end. The second portion coupling end may define an opposed and generally axially extending pair of second receiving notches. The second portion coupling end may also include a second latching structure defining the other of a male latching member and a female latching member. The first and second coupling ends may be joinable to one another through engagement of the first and second latching structure. When the first and second latching structures are engaged, the pair of first receiving notches may be substantially aligned with the pair of second receiving notches and may cooperate with the pair of second receiving notches to define a pair of first attachment openings. The attachment openings may be configured to receive an elongated structural member, such as rebar, of a supportive mesh for the pervious pavement installation.

According to another embodiment, a conduit for supporting a reinforcing mesh and in a pervious pavement installation may include a first portion including a first portion coupling end defining a pair of first receiving notches and a pair of third receiving notches oriented substantially perpendicular to the pair of first receiving notches. The first receiving notches and the third receiving notches may cooperate to define first portion crenellations extending around the first portion coupling end. The conduit may also include a second portion including a second portion coupling end engageable with the first portion coupling end to couple the second portion to the first portion. The second portion coupling end may define a pair of second receiving notches and a pair of fourth receiving notches oriented substantially perpendicular to the pair of second receiving notches. The second receiving notches and the fourth receiving notches may cooperate to define second portion crenellations extending around the second portion coupling end. When the second portion is coupled to the first portion, the first receiving notches may cooperate with the second receiving notches to define a pair of first attachment openings, and the third receiving notches may cooperate with the fourth receiving notches to define a pair of second attachment openings. The attachment openings are configured to receive an elongated structural member, such as rebar, of a supportive mesh for the pervious pavement installation.

According to another embodiment, a supporting conduit for the formation of pervious pavement may be provided. The conduit may include a first connector having a first tube receiving section, a first connector coupling end, and a first connector distal end. The first tube receiving section may include a first stop member. The first connector coupling end may define an opposed and generally axially extending pair of first receiving notches and may also include a first latching structure, the first latching structure defining one of a male latching member and a female latching member. The conduit may further include a second connector having a second tube receiving section, a second connector coupling end, and a second connector distal end. The second tube receiving section may include a second stop member. The second connector coupling end may define an opposed and generally axially extending pair of second receiving notches and may also include a second latching structure, the second latching structure defining the other of a male latching member and a female latching member. The conduit may include wherein the first and second coupling ends are joinable to one another through engagement of the first and second latching structures. The conduit may also include wherein when the first and second latching structures are engaged the pair of first receiving notches is substantially transverse to the pair of second receiving notches and wherein the pair of first receiving notches cooperates with the second connector to define a pair of first attachment openings. The conduit may further include wherein the pair of second receiving notches cooperates with the first connector to define a pair of second attachment openings.

According to another embodiment, a conduit for supporting a reinforcing mesh and in a pervious pavement installation may be provided. The conduit may include a first connector including a first connector coupling end defining a first end surface and a pair of first receiving notches, the first receiving notches oriented substantially opposite each other and cooperating to define first connector crenellations extending around the first connector coupling end. The conduit may also include a second connector including a second connector coupling end engageable with the first connector coupling end to couple the second connector to the first connector. The second connector coupling end may define a second end surface and a pair of second receiving notches, the second receiving notches oriented substantially opposite each other and cooperating to define second connector crenellations extending around the second connector coupling end. The conduit may also include wherein when the second connector is coupled to the first connector, the first receiving notches cooperate with the second end surface to define a pair of first attachment openings, and the second receiving notches cooperate with the first end surface to define a pair of second attachment openings.

Other features and advantages of the invention will be apparent from the following specification taken in conjunction with the following drawings.

BRIEF DESCRIPTION OF THE DRAWINGS

To understand the present invention, it will now be described by way of example only, not by way of limitation, with reference to the accompanying drawings.

DETAILED DESCRIPTION

Figure 1:
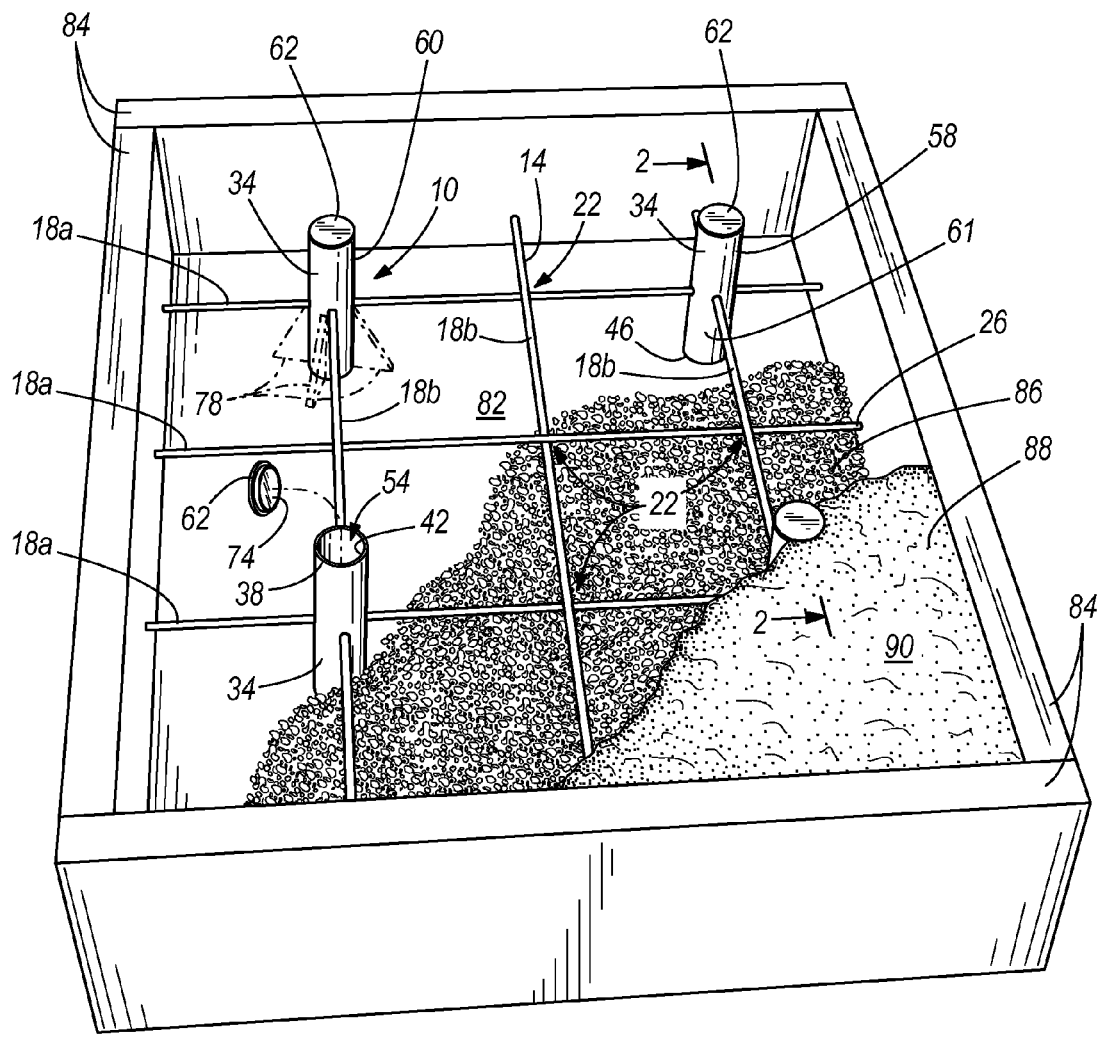
FIG. 1 is a perspective view of previous pavement sample installation including a wire mesh with tubular inserts.

While the subject matter of this disclosure can be embodied in many different forms, there is shown in the drawings and will herein be described in detail preferred embodiments with the understanding that the present disclosure is to be considered as an exemplification of certain principles and is not intended to limit the broad aspects of the disclosed subject matter to the embodiment(s) illustrated.

Figure 2:
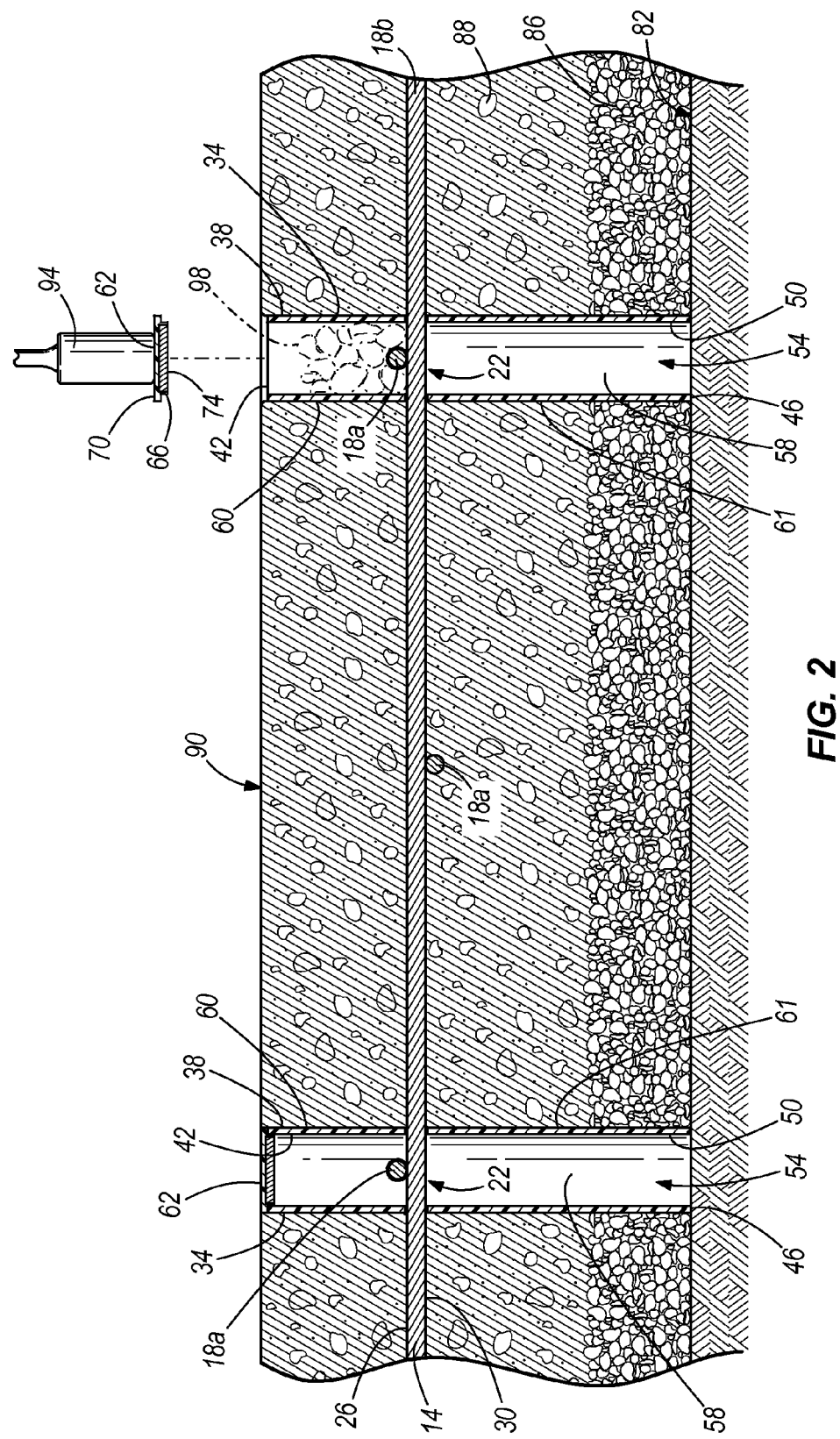
FIG. 2 is a section view taken along line 2-2 of FIG. 1 and showing the installation including the wire mesh with tubular inserts after completion of the pervious pavement.
Figure 3:
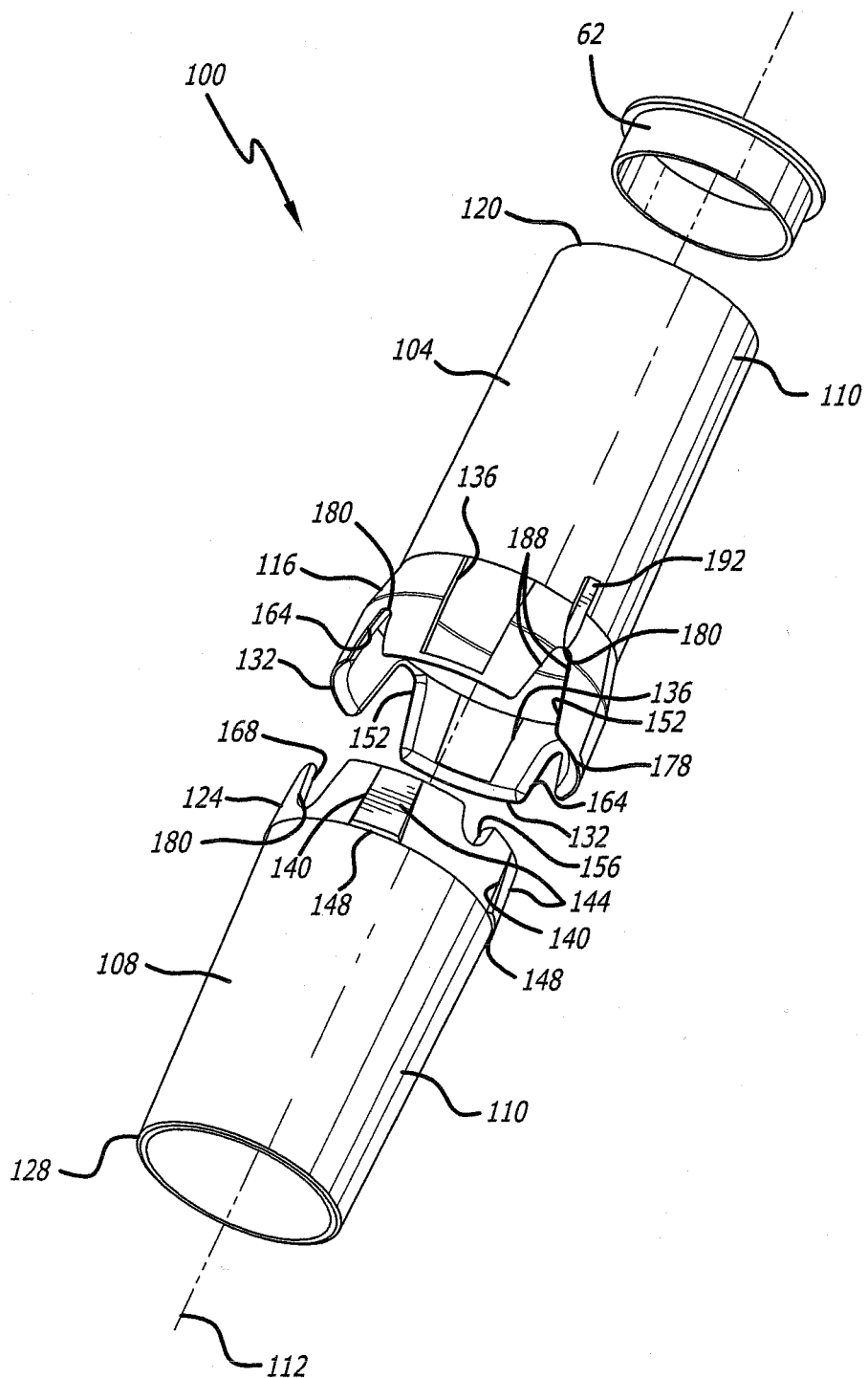
FIG. 3 is an exploded perspective view of an alternative embodiment of a conduit for the formation of pervious pavement.

Referring now to the figures, and specifically to FIGS. 1 and 2, a mesh assembly 10 is provided for the formation of pervious pavement. The mesh assembly 10 includes a structural reinforcing mesh 14 formed by first and second sets of elongated structural members 18a, 18b. The first set of elongated structural members 18a extend generally in a first direction, and the second set of elongated structural members 18b extend generally in a second direction that is angled with respect to the first direction. The mesh 14 includes a plurality of intersections 22 and has a first side 26 and a second side 30 opposite the first side 26. A plurality of conduits 34 are formed separately from and coupled to the mesh 14.

In the illustrated embodiment, the members 18a, 18b are formed from structurally reinforcing steel wire, such as, for example, 10 gauge steel wire, and are woven or interlaced with one another. In other embodiments, the mesh 14 can be formed by rebar, one or more stampings, cables, wires of different sizes, combinations of rebar, stampings, wires, and/or cable, and the like, which may be formed of metals, polymers, composites, and the like. In some embodiments, the woven or interlaced nature of the mesh 14 couples the members 18a, 18b to each other. In other embodiments, the members 18a, 18b may be coupled together by the conduits 34. In still other embodiments, the members 18a, 18b may be joined by welding, brazing, adhesives, fasteners, tie-wire, and the like. In the illustrated embodiment the first set of elongated structural members 18a and the second set of elongated structural members 18b are substantially perpendicular to one another. In other embodiments the members 18a, 18b can be oriented at other angles with respect to one another, and can include additional sets of members oriented at different angles to the first and second set 18a, 18b.

As best shown in FIG. 2, each conduit 34 includes a first end 38 defining a first opening 42, a second end 46 opposite the first end 38 and defining a second opening 50, and a passageway 54 extending between the first opening 42 and the second opening 50. In one embodiment, each conduit 34 is substantially tubular and includes a sidewall 58. In an alternate embodiment, not shown, the conduits 34 are slightly conical, with the larger opening being placed adjacent the subgrade surface 82 during installation. Conical conduits 34 allow for stacking of the mesh assemblies 10 for storage purposes. The conduits 34 are coupled to the mesh 14 such that the first opening 42 is positioned on the first side 26 of the mesh 14 and the second opening 50 is positioned on the second side 30 of the mesh 14. In the illustrated embodiment the conduits 34 extend substantially perpendicularly through the mesh 14, but in other embodiments one or more of the conduits 34 may extend through the mesh 10 at other angles.

In the illustrated embodiment, the conduits 34 are non-removably attached to the mesh 14 by having one of the first set of elongated structural members 18a and one of the second set of elongated structural members 18b extending through the sidewall 58. More specifically, the illustrated conduits 34 are positioned on the mesh 14 such that each conduit 34 surrounds one of the intersections 22. In this regard, individual intersections 22 are located within the passageway 54 of a respective conduit 34. In other embodiments, one or more of the conduits 34 may be positioned with the mesh 14 such that only one elongated structural member 18a, 18b extends through the sidewall 58 of one or more of the conduits 34. To increase the lifespan of the structural members 18 of the mesh 14 located within the passageway 54 of the respective conduits 34, the structural members 18 within the conduits 34 may have an epoxy or other coating applied on their surface thereto, for example, to assist in rust prevention of the mesh 14 material. In one embodiment the coating is applied to the structural members 18 by a spray process after the structural members 18 are positioned within the conduits 34. Alternately, the coating may be applied prior to installation of the structural members 18 within the conduits 34. In still other embodiments, one or more of the conduits 34 may be attached to the mesh in a different way that does not necessarily involve having one of the elongated structural members 18a, 18b extending through the sidewall 58, for example, by welding, brazing, epoxy, or the like.

In one embodiment, the conduits 34 are formed of plastic and are overmolded onto the mesh 14. In this regard, the mesh 14 may be formed of a first material and the conduits 34 may be formed of a second material different from the first material. In other embodiments, openings may be pre-formed in the sidewalls 58 of the conduits 34 and the individual structural members 18a, 18b may be threaded through openings to form the mesh 14. In each case, the conduits 34 are located such that a first or upper portion 60 of the conduit 34, which includes the first end 38 and first opening 42, is located on the first side 26 of the mesh 14, and a second or lower portion 61 of the conduit 34, which includes the second end 46 and the second opening 50, is located on the second side 30 of the mesh 14.

In some embodiments, the mesh assembly 10 also includes a plurality of caps 62. Each cap 62 is configured to be received by the first opening 42 of a respective one of the conduits 34. In the illustrated embodiment, each cap 62 includes a sleeve portion 66 that fits within the first opening 42 and a flange portion 70 that engages the first end 38 of the conduit. In some embodiments, the caps 62 are each provided with a ferromagnetic insert 74. In other embodiments, the caps 62 may themselves be formed of a ferromagnetic material. As used herein, "ferromagnetic material" refers to a material that is itself a magnet or that is attracted to a magnet. The caps 62 are provided to substantially prevent material, such as paving material, from entering the conduits 34 through the first opening 42 when the pervious pavement is being prepared, as discussed further below. As shown in phantom in FIG. 1, the conduits 34 may also include radially outwardly extending support walls 78 that provide additional support for the conduits to limit shifting or bending of the conduits during the installation process, as also discussed further below.

To install the mesh 14 and form a pervious pavement, a subgrade surface 82 is prepared. The subgrade surface 82 may be any suitable material such as sand, gravel, and the like, and is generally leveled or graded as desired for a particular application, as generally understood in the art. Depending on the application, one or more forms 84 (FIG. 1) may be used to define the area to be paved. In FIG. 1, the forms 84 are arranged in a square over a relatively small area. It should be appreciated, however, that the mesh assembly 10 can be used in the paving of areas of substantially any size and shape, and that the size and number of conduits and the size of the mesh will vary for specific applications.

With the subgrade surface 82 prepared, the mesh 14 is positioned on the subgrade surface 82 within the forms 84 such that the second ends 46 of the conduits 34, which are open and do not include caps 62, engage the subgrade surface 82. Optionally, the second ends 46 may be pressed into the subgrade surface 82 or additional subgrade surface material can be back-filled around the second ends 46 such that the second ends 46 are located a distance below the subgrade surface 82. With the second ends 46 of the conduits 34 positioned on or in the subgrade surface 82, the conduits 34 support the mesh 14 a distance above the subgrade surface 82. In this regard, the conduits 34 function as a support or chair to space the mesh 14 above the subgrade surface 82.

Once the mesh assembly 10 is positioned on the subgrade surface 82, an optional subbase material 86 can be poured onto the subgrade surface 82 and over the mesh 14 such that the second ends 46 of the conduits 34 are covered by the subbase material 86. By way of example only, in the illustrated embodiment, the subgrade surface 82 is sand and the subbase material 86 may be pea gravel. Other materials or other combinations of paving layers may also be included depending on the particular application. For example, in some applications, rather than positioning the ends 46 of the conduits 34 on the subgrade surface 82, the ends 46 of the conduits 34 may be positioned on top of the subbase material 86, or the ends 46 may be positioned within the layer of subbase material 86.

After the mesh assembly 10 is positioned on the subgrade surface 82 and, optionally, after the subbase material 86 has been poured over the ends 46 of the conduits, pourable paving material 88 is poured onto the subgrade surface 82 or subbase material 86 and over the mesh 14. During pouring, the paving material 88 is poured into the spaces between the conduits 34 preferably in a controlled manner that avoids applying substantial paving material 88 directly onto the upper or first ends 38 of the conduits 34. In this regard, the caps 62 can function to limit or substantially prevent paving material 88 from entering into the passageways 54 of the conduits 34 such that the passageways 54 remain substantially open between their respective first and second ends 38, 46. Also, if one or more of the conduits 34 is provided with the support walls 78 (see FIG. 1), the support walls 78 function to limit shifting or bending of the conduits 34 and mesh 14 as the paving material 88 is poured. The paving material 88 is poured until a top surface 90 of the paving material is substantially even with the first ends 38 of the conduits 34. Various surface treatments, such as brooming or smoothing, may then be performed on the top surface 90 of the paving material 88 as desired.

After the desired surface treatment has been completed, the caps 62, which include ferromagnetic material either in the inserts 74 or in the caps 62 themselves, can be removed from the first ends 38 using a magnetic force. For example, as shown in FIG. 2, a magnet 94 can be engaged with or passed over the top of the caps 62 such that the resulting magnetic attraction pulls the caps 62 out of their respective first openings 42. The caps 62 can be removed individually using a single magnet 94, as illustrated, or larger, more powerful magnets can be passed over larger areas of pavement to remove multiple caps 62 substantially at the same time. Although it is generally contemplated that the caps 62 are removed before the pavement fully sets, sufficiently strong magnets and proper surface treatments can allow for the caps 62 to be removed after the pavement has fully set.

In one embodiment, after the caps 62 have been removed and the pavement has set, the upper portions 60 of the conduit 34 optionally can be filled with drainage material 98 (shown in phantom in FIG. 2) such as pea gravel or another pervious material. As shown in FIG. 2, the intersection 22 of the members 18a, 18b defines a support structure for supporting the drainage material 98 within the upper portion 60 of the conduit 34 and substantially preventing the drainage material 98 from falling into the lower portion 61 of the conduit 34.

Regardless of whether the upper portions 60 of the conduits 34 are filled with drainage material 98, when the paving material 88 has set and become substantially water impervious, the conduits 34 and, more specifically, the passageways 54 of the conduits 34 provide an open flow path for water to pass from the top surface 90 of the pavement through to the subgrade surface 82. The resulting pervious pavement can reduce the need for grading and more complex and substantial water runoff and collection structures such as sewers and drains by allowing water to pass directly through the pavement to the subgrade where it can percolate into the ground.

Referring now to FIGS. 3-8, an alternative embodiment of a conduit 100 is illustrated. The illustrated conduit 100 may be attached, for example by snap-fitting, to the mesh 14 and is configured to support the mesh 14 above the subgrade surface 82 and to provide an open flow path for water to pass from the top surface 90 of the pavement through to the subgrade surface 82. The conduit 100 includes a first portion 104 and a second portion 108 that is securable to the upper portion 104. In the illustrated arrangement the first portion 104 is configured as an upper portion and receives the cap 62, while the second portion 108 is configured as a lower portion and engages the subgrade surface 82. It should be appreciated however that the conduit 100 could be inverted. The first and second portions 104, 108 are both provided with a hollow tubular section 110 that, in the exemplary embodiment, are generally cylindrical, and that cooperate to define a central axis 112 of the conduit 100. In other embodiments, the hollow section of the first and second portions 104, 108 may be or include a square section, triangular section, octagonal section, cross-shaped section, polygon section, round section, arcuate section, and combinations of these. Moreover, the hollow section is not necessarily continuous along the length of the conduit 100, and may, for example, transition from a round section to a square or other section.

The first portion 104 includes a first portion coupling end 116 and a first portion distal end 120 that, in the illustrated arrangement, is configured to receive the cap 62. The second portion 108 includes a second portion coupling end 124 joinable to the first portion coupling end 116 and a second portion distal end 128. In the illustrated configuration, the second portion coupling end 124 is received within the first portion coupling end 116. To join the first and second portion coupling ends 116, 124 to one another, the first portion coupling end 116 is provided with first latching structure and the second coupling end is provided with second latching structure engageable with the first latching structure. In the illustrated configuration, the first latching structure includes a plurality of first portion securement tabs in the form of axially extending walls 132, with each wall 132 defining a substantially rectangular opening 136. The second latching structure includes a plurality of axially extending second portion securement tabs 140 defining ramps 144, with each ramp having a radially outwardly extending lip 148. The tabs 140 are configured to fit within the openings 136. As the first and second portion coupling ends 116, 124 are moved into engagement, the walls 132 are urged radially outwardly by the ramps 144 until the lips 148 of each tab 140 move into the openings 136, at which point the walls 132 snap radially inwardly and secure the first and second portion coupling ends 116, 124 to one another.

In the exemplary illustrated embodiment, the walls 132 and openings 136 on the first portion coupling end 116 comprise female latching members and the tabs 140 on the second portion coupling end 124 comprise male latching members. It should be appreciated however that the male and female latching members could be reversed. It should also be appreciated that the male and female latching members could be mixed. For example, the first portion coupling end 116 may include two male latching members and two female latching members, with the second portion coupling end 124 being provided with complimentary two female latching members and two male latching members. A variety of alternative male and female latching members may also or alternatively be provided without departing from the spirit and scope of the present invention. For example, other types of female latching members, such as slots, openings, channels, grooves, and the like may be cooperatively arranged with other types of male latching members such as tabs, pins, ribs, projections, and the like and adapted for securing the first portion 104 and the second portion 108 of the conduit 100 to one another.

The first portion 104 and the second portion 108 are also provided with engagement structure for securing the conduit 100 to the mesh 14. More specifically, the first and second portions 108 are provided with engagement structure that can be secured on our around the elongated structural members 18 of the mesh 14. In this regard, in the illustrated embodiment the first portion coupling end 116 defines a diametrically opposed and generally axially extending pair of first receiving notches 152, and the second portion coupling end 124 defines a diametrically opposed and generally axially extending pair of second receiving notches 156. The first receiving notches 152 and the second receiving notches 156 are configured such that when the first and second portion coupling ends 116, 124 are joined to one another, the pair of first receiving notches 152 is substantially circumferentially aligned with the pair of second receiving notches 156 and cooperates with the pair of second receiving notches 156 to define a pair of first attachment openings 160. In the illustrated configuration, the first attachment openings 160 are substantially diametrically opposed to one another and are substantially round for snugly receiving and engaging one of the elongated structural members 18 of the mesh 14.

Although some embodiments of the conduit may include only the pairs of first receiving notches 152 and second receiving notches 156, in the illustrated embodiment, the first portion coupling end 116 also defines a diametrically opposed and axially extending pair of third receiving notches 164, and the second portion coupling end 124 also defines a diametrically opposed and generally axially extending pair of fourth receiving notches 168. The pair of third receiving notches 164 is oriented generally transverse to the pair of first receiving notches 152, and the pair of fourth receiving notches 168 is oriented generally transverse to the pair of second receiving notches 156. The third receiving notches 164 and the fourth receiving notches 168 are configured such that when the first and second portion coupling ends 116, 124 are joined to one another, the pair of third receiving notches 164 is substantially circumferentially aligned with the pair of fourth receiving notches 168 and cooperates with the pair of fourth receiving notches 168 to define a pair of second attachment openings 172. In the illustrated configuration, the second attachment openings 172 are substantially diametrically opposed to one another and are oriented generally transverse to the first attachment openings 160. In this way, the conduit 100 can be secured to the intersection 22 (see FIGS. 1 and 2) of the mesh 14 with one of the elongated structural members, such as member 18a, extending through the first attachment openings 160 and the other of the elongated structural members, such as member 18b, extending through the second attachment openings 172. Like the first attachment openings 160, the illustrated second attachment openings 172 are substantially round for snugly receiving and engaging one of the elongated structural members 18 of the mesh 14.

Figure 4:
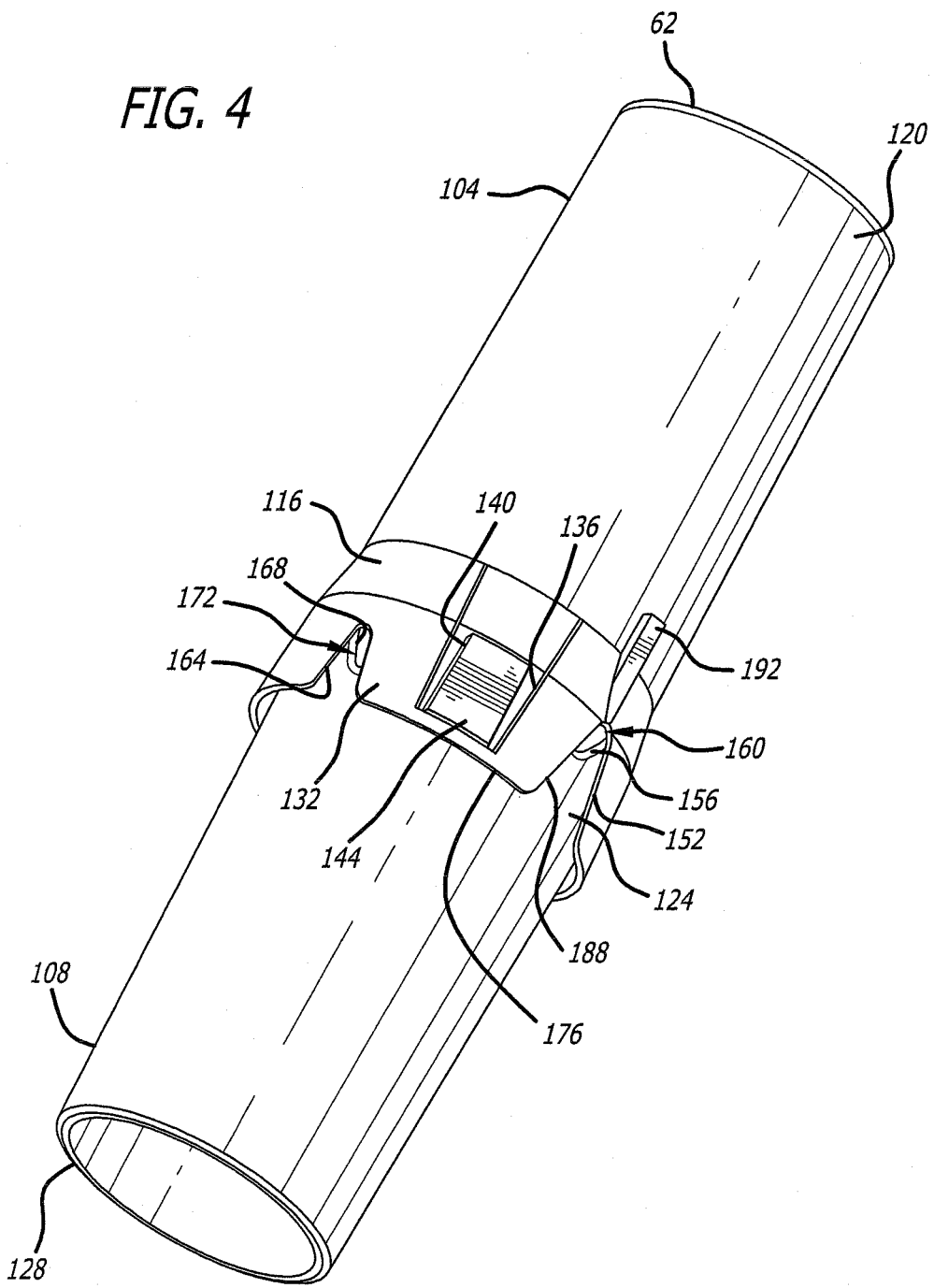
FIG. 4 is a perspective view of the conduit of FIG. 3
Figure 5:
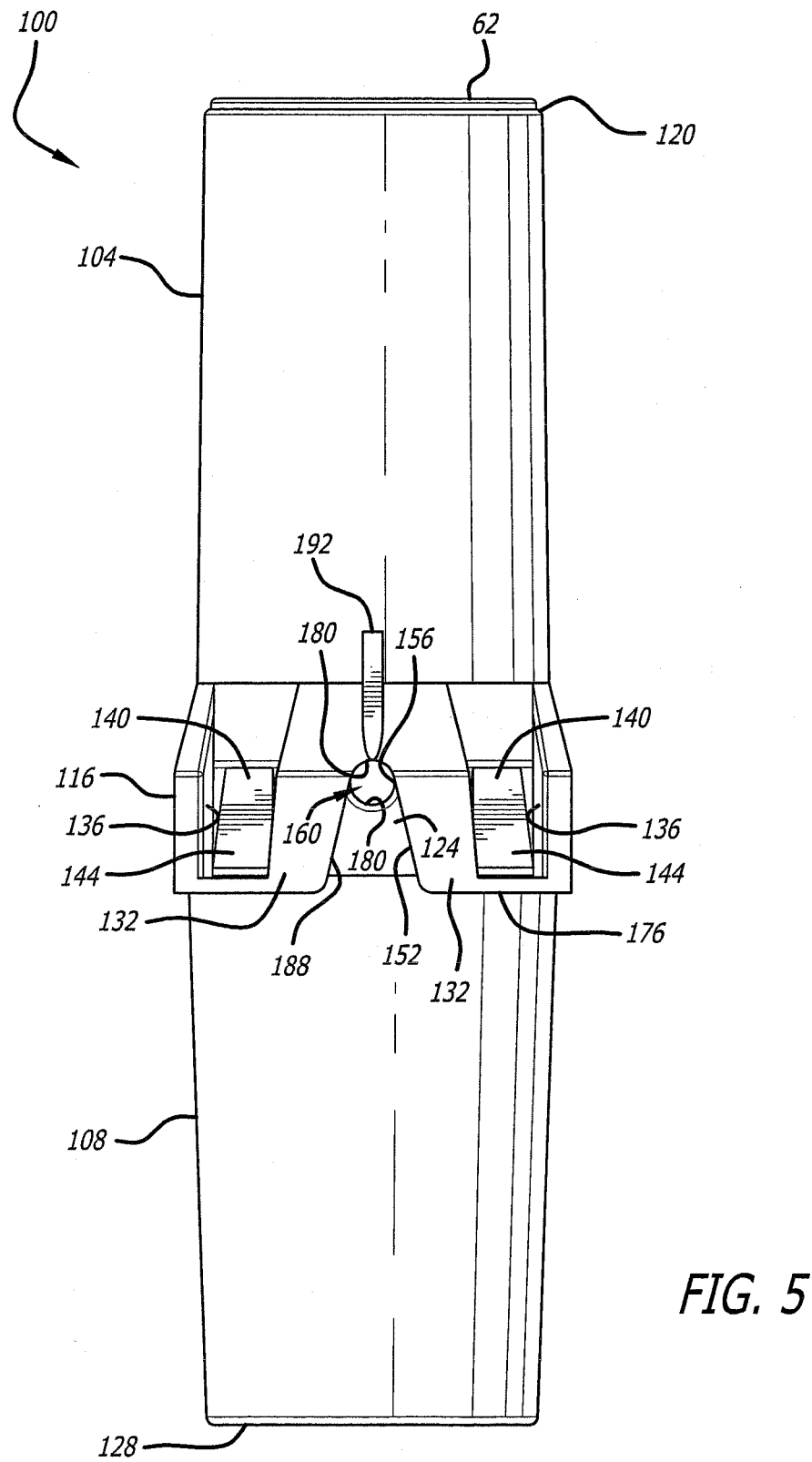
FIG. 5 is a front view of the conduit of FIG. 3.
Figure 6:
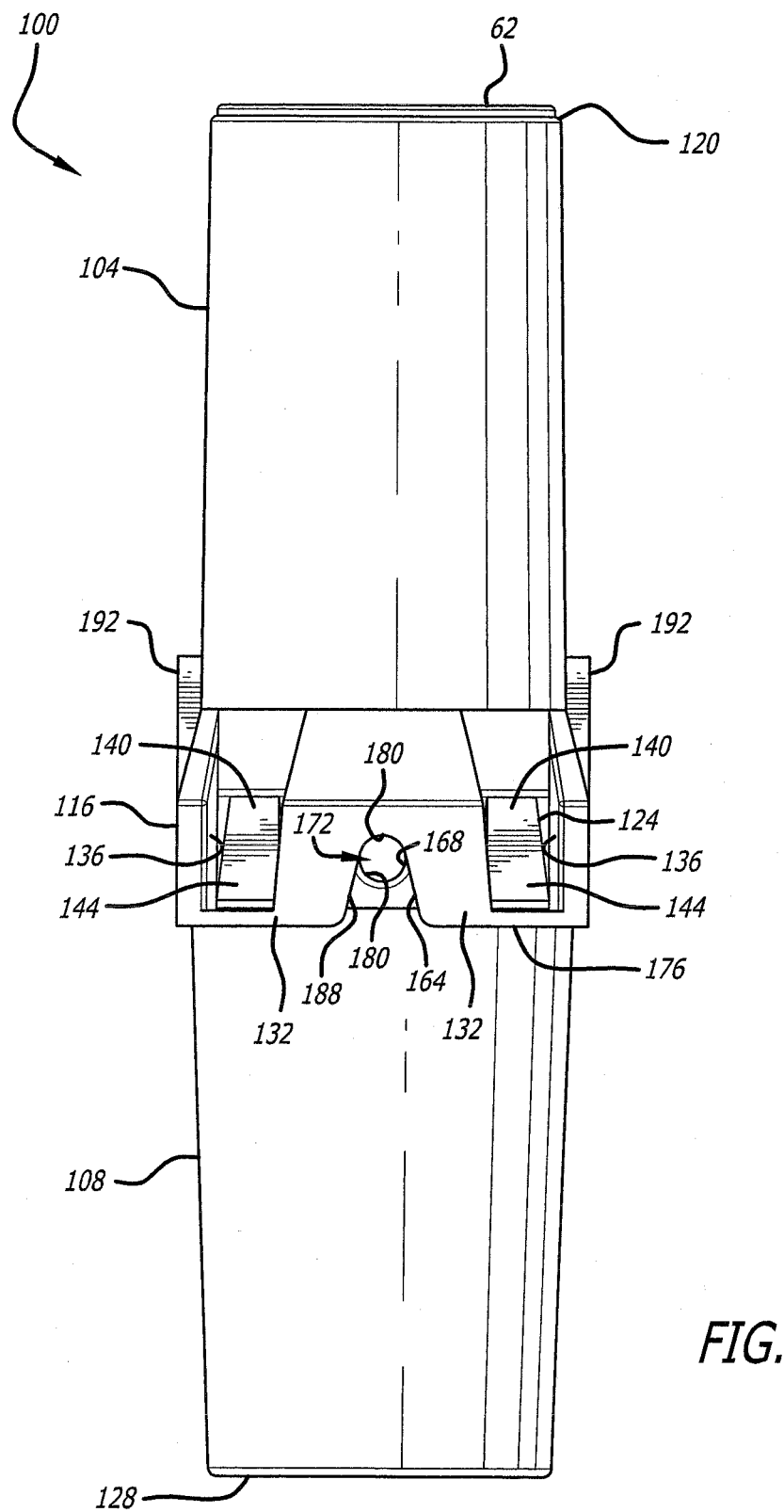
FIG. 6 is a side view of the conduit of FIG. 3.
Figure 7:
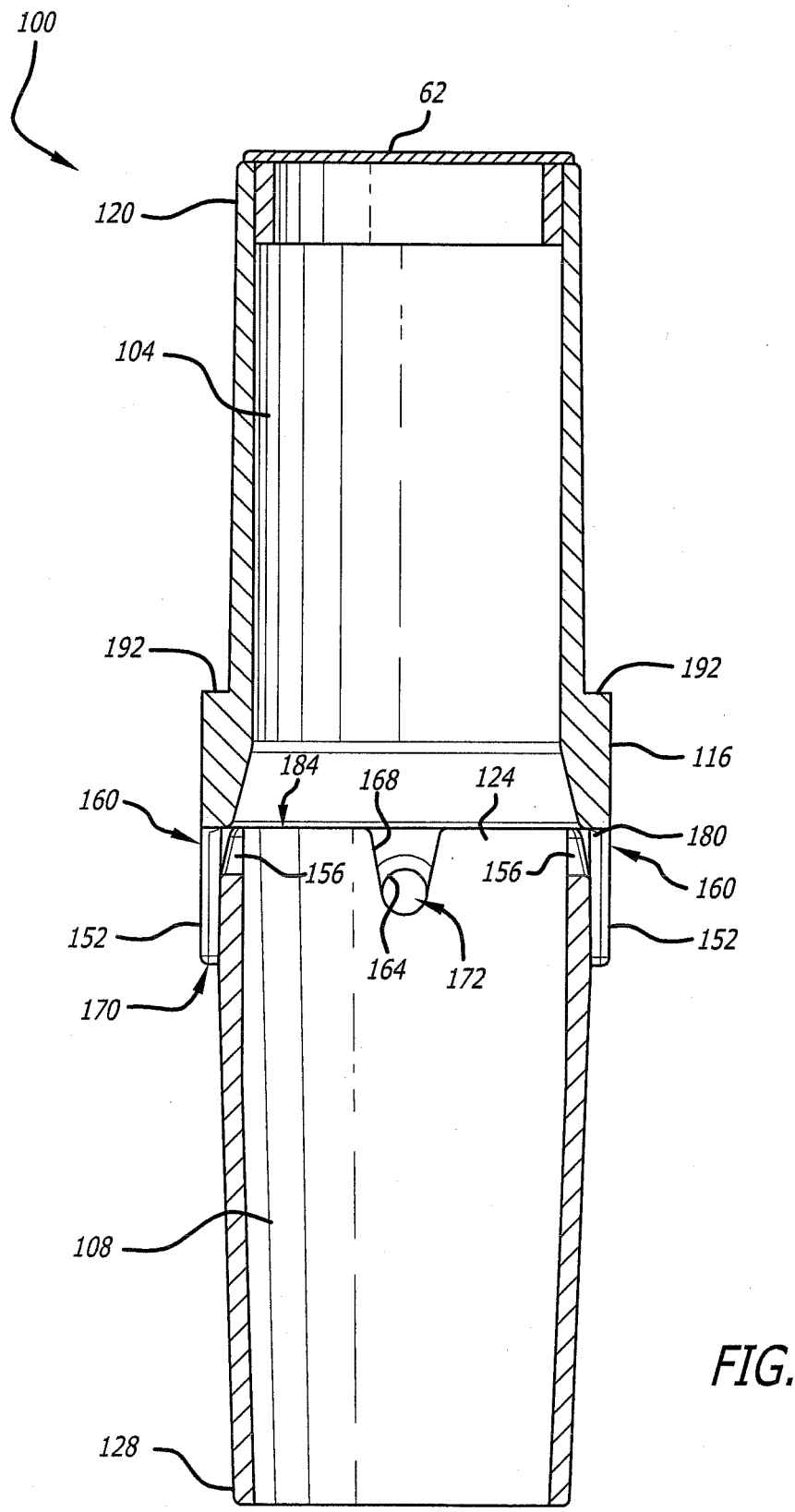
FIG. 7 is a section view taken along line 7-7 of FIG. 5.
Figure 8:
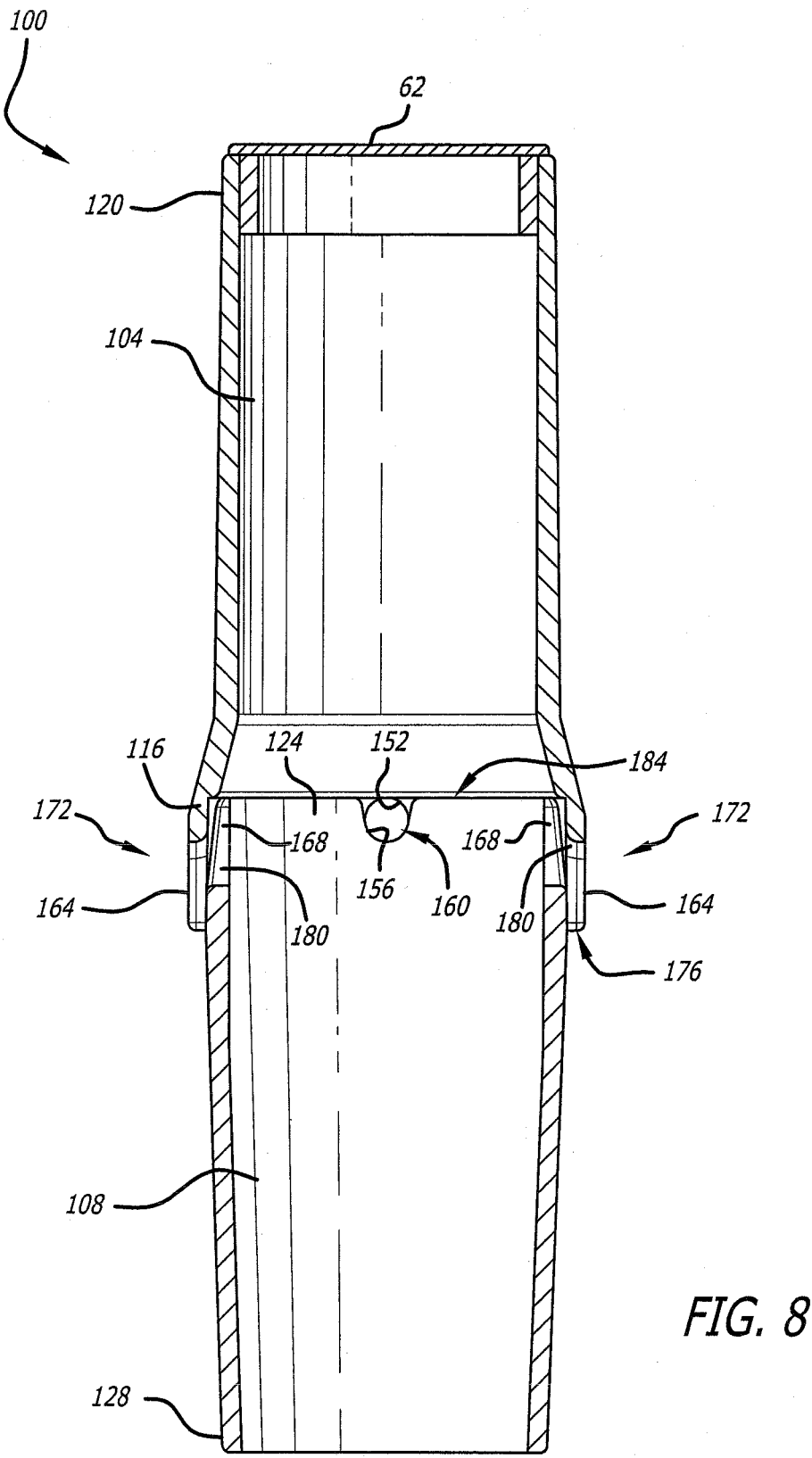
FIG. 8 is a section view taken along line 8-8 of FIG. 6.

As best seen in FIG. 4, the pair of first attachment openings 160 is closer to the first portion distal end 120 than the pair of second attachment openings 172. This configuration accounts for the fact that the mesh 14 is generally constructed of interwoven elongated structural members 18, where the intersections 22 include one elongated structural member 18 extending over or under the other elongated structural member 18. To achieve the configuration in which the pair of first attachment openings 160 is closer to the first portion distal end 120 than the pair of second attachment openings 172, the pair of first receiving notches 152 extends further into the first portion coupling end 116 than the pair of third receiving notches 164, and the pair of fourth receiving notches 168 extends further into the second coupling end 124 than the pair of second receiving notches 156. More specifically, the first portion coupling end 116 includes a first end surface 176, and each of the first and third receiving notches 152, 164 includes a notch depth defined as a distance from the first end surface 176 to a distal end 180 of the respective first or third receiving notch 152, 164. The notch depths of the first receiving notches 152 are greater than the notch depths of the third receiving notches 164. In a corresponding manner, the second portion coupling end 124 includes a second end surface 184, and each of the third and fourth receiving notches 156, 168 includes a notch depth defined as a distance from the second end surface 184 to the distal end 180 of the respective second or fourth receiving notches 156, 168. The notch depths of the second receiving notches 156 are less than the notch depths of the fourth receiving notches 168.

In the illustrated embodiment, the first attachment openings 160 are cooperatively defined by the distal ends 180 of the first and second receiving notches 152, 156, and the second attachment openings 172 are cooperatively defined by the distal ends 180 of the third and fourth receiving notches 164, 168. To accommodate the round cross-section elongated structural members 18, the distal end 180 of each receiving notch is substantially arcuate, such that the resulting attachment opening 160, 172 is substantially circular. It should be appreciated that the specific size, shape, and configuration of the receiving notches 152, 156, 164, 168 can be modified to accommodate a mesh 14 having a different configuration of structural members. However, in the illustrated embodiment, the receiving notches 152, 156, 164, 168 include the aforementioned arcuate distal ends 180 and angled sidewall portions 188 that are narrower adjacent the distal ends 180 and wider adjacent the respective first or second end surface 176, 184. The angled sidewall portions 188 may facilitate positioning the first and second portions 104, 108 with respect to the elongated structural members 18 of the mesh 14 by guiding the elongated structural members toward the distal ends 180 of the notches 152, 156, 164, 168.

To further facilitate positioning of the first and second portions 104, 108 on the mesh 14, one or both of the first and second portions 104, 108 may be provided with alignment indicia 192 to help align at least one pair of receiving notches 152, 156, 164, 168 with the elongated structural members. In the illustrated configuration, alignment indicia 192 is provided on the first portion 104 and takes the form of a pair of diametrically opposed and axially extending ribs that are substantially coplanar with the first receiving notches 152. As discussed above, the first receiving notches 152 are configured to receive the upper elongated structural member 18 of a given intersection 22 by virtue of the first receiving notches 152 having a greater depth than the second receiving notches 158, which are configured to receive the lower elongated structural member of a given intersection 22. An installer can thus align the alignment indicia 192 with the upper elongated structural member 18 and position the first portion 104 onto the intersection 22, which makes it easier for the installer to ensure that the first portion 104 is properly oriented such that the first receiving notches 152 are positioned to receive the upper elongated structural member 18.

The illustrated first and second portions 104, 108 each include an alternating arrangement of receiving notches. For example, the first portion 104 includes an alternating arrangement of first receiving notches 152 and third receiving notches 164, while the second portion 108 includes an alternating arrangement of second receiving notches 158 and fourth receiving notches 168. The alternating arrangements of notches provide the first and second coupling ends 116, 124 with a crenellated structure. More specifically, the first receiving notches 152 and the third receiving notches 164 cooperate to define first portion crenellations extending around the first portion coupling end 116, and the second receiving notches 158 and the fourth receiving notches 168 cooperate to define second portion crenellations extending around the second portion coupling end 124. When the first and second portions 104, 108 are joined together, the crenellated structures cooperate to capture the elongated structural members 18 at the intersections 22 of the mesh 14.

To install the conduit 100 for use in a pervious pavement application, an installer identifies an intersection 22 of the mesh 22 to which the conduit 100 is to be secured. The installer then appropriately aligns one of the first and second portions 104, 108 with the intersection 22. Appropriate alignment involves aligning the pairs of receiving notches 152, 156, 164, 168 with either the upper or the lower elongated structural member 18 that defines the intersection. Although the order of installation can be reversed, by way of example only, the second portion 108 will be used as the lower portion of the conduit 100 and will be installed first. The second portion 108 is positioned below the intersection 22 and the pair of fourth receiving notches 168 is aligned with the lower elongated structural member 18 and the pair of second receiving notches 156 is aligned with the upper elongated structural member 18. The different depths of the second and fourth receiving notches 156 accommodate the different vertical location of the elongated structural members 18 due to the members passing over/under one another. The second portion distal end 128 may then be positioned on the subgrade surface 82 and may support the mesh 14. The first portion 104 is then positioned over the intersection 22 and the first receiving notches 152 are aligned with the upper elongated structural member 18 and the third receiving notches 164 are aligned with the lower elongated structural member 18. The alignment indicia 192 may facilitate proper alignment of the first portion 104. The first portion 104 is then moved downwardly such that the first portion coupling end 116 moves into engagement with the second portion coupling end 124. Slight misalignment between the first portion 104 and the second portion 108 may be resolved as the first portion 104 is moved downwardly and the angled sidewall portions 188 of the notches 152, 164 engage and guide the elongated structural members toward the distal ends 180 of the notches 152, 164. As the first and second portion coupling ends 116, 124 are moved into engagement, the walls 132 of the first portion coupling end 116 are urged radially outwardly by the ramps 144 until the lips 148 of each tab 140 move into the openings 136, at which point the walls 132 snap radially inwardly and secure the first and second portion coupling ends 116, 124 to one another. After completing installation of as many conduits 100 as a particular application requires, subbase material 86 and/or paving material maybe poured around the conduits 100 and over the mesh 14 in the manner discussed above to complete the pervious pavement installation.

Referring now to FIGS. 9-12, an alternative embodiment of a conduit 200 is illustrated. The illustrated conduit 200 may be attached, for example by snap-fitting, to the mesh 14 and is configured to support the mesh 14 above the subgrade surface 82 and to provide an open flow path for water to pass from the top surface 90 of the pavement through to the subgrade surface 82. The conduit 200 includes a first connector 204 and a second connector 208 that is securable to the first connector 204. In the illustrated arrangement the first connector 204 is connected to a first tube 210 that is configured as an upper portion and is configured to receive the cap 62, while the second connector 208 is connected to a second tube 211 that is configured as a lower portion and engages the subgrade surface 82. It should be appreciated however that the conduit 200 could be inverted. The first and second tubes 210, 211 are configured as hollow tubular sections that, in the exemplary embodiment, are generally cylindrical, and that cooperate to define a central axis 212 of the conduit 200. In other embodiments, the first and second tubes 210, 211 may be or include a square section, triangular section, octagonal section, cross-shaped section, polygon section, round section, arcuate section, and combinations of these. Moreover, the first and second tubes 210, 211 are not necessarily continuous along the length of the conduit 200, and may, for example, transition from a round section to a square or other section.

The first connector 204 includes a first tube receiving section 254 defined by a first stop member 250. Similarly, the second connector 208 includes a second tube receiving section 255 defined by a second stop member 251. The first and second stop members 250, 251 are shown as circumferential shoulders bisecting the interior wall of the first and second connectors 204, 208 respectively. However, the stop members may be any other suitable structure, such as a plurality of pins, ledges, bumps, protrusions or the like. The first and second tube receiving sections 254, 255 are sized and shaped to receive an end of the first and second tubes 210, 211 respectively, where the first and second stop members 250, 251 engage the leading edge of the first and second tubes 210, 211 and prevent the tubes from being inserted further into the first and second connectors 204, 208.

The first connector 204 includes a first connector coupling end 216 and a first connector distal end 220 that, in the illustrated arrangement, is configured to receive the first tube 210. The second connector 208 includes a second connector coupling end 224 joinable to the first connector coupling end 216 and a second connector distal end 228. In the illustrated configuration, the second connector coupling end 224 is received by the first connector coupling end 216. To join the first and second connector coupling ends 216, 224 to one another, the first and second connector coupling ends 216, 224 are each provided with first latching structure and second latching structure, the first latching structure of each connector engageable with the second latching structure of the other connector. In the illustrated configuration, the first latching structure includes a first connector securement tab in the form of an axially extending wall 232, the wall 232 defining an opening 236. The second latching structure includes a plurality of axially extending second portion securement tabs 240 defining ramps 244, with each ramp 244 having a radially outwardly extending lip 248. The tabs 240 are configured to fit within the opening 236. As the first and second connector coupling ends 216, 224 are moved into engagement, the wall 232 is urged radially outwardly by the ramps 244 until the lips 248 of each tab 240 move into the opening 236, at which point the wall 232 snaps radially inwardly and secures the first and second connector coupling ends 216, 224 to one another. The first and second connectors 204, 208 may be identical components that are rotationally oriented as mirror opposites for connection together. This allows a single connector part to be used for both first and second connectors, thereby minimizing manufacturing and distribution costs.

In the exemplary illustrated embodiment, the walls 232 and openings 236 of the first latching structure comprise female latching members and the tabs 240 of the second latching structure comprise male latching members. It should be appreciated however that the male and female latching members could be reversed. It should also be appreciated that the male and female latching members could be mixed. For example, the first connector coupling end 216 may include two male latching members, with the second connector coupling end 224 being provided with complimentary two female latching members. A variety of alternative male and female latching members may also or alternatively be provided without departing from the spirit and scope of the present invention. For example, other types of female latching members, such as slots, openings, channels, grooves, and the like may be cooperatively arranged with other types of male latching members such as tabs, pins, ribs, projections, and the like and adapted for securing the first connector 204 and the second connector 208 of the conduit 200 to one another.

The first connector 204 and the second connector 208 are also provided with engagement structure for securing the conduit 200 to the mesh 14. More specifically, the first and second connectors 204, 208 are provided with engagement structure that can be secured on or around the elongated structural members 18 of the mesh 14. In this regard, in the illustrated embodiment the first connector coupling end 216 defines a first end surface 276 having an opposed and generally axially extending pair of first receiving notches 252, and the second connector coupling end 224 defines a second end surface 284 and having an opposed and generally axially extending pair of second receiving notches 256. The first receiving notches 252 and the second receiving notches 256 are configured such that when the first and second connector coupling ends 216, 224 are joined to one another, the pair of first receiving notches 252 is substantially circumferentially transverse (e.g., offset 90 degrees) with the pair of second receiving notches 256, and the first and second end surfaces 276, 284 cooperates with the second and first receiving notches 256, 252 respectively to define a pair of first attachment openings 260 and a pair of second attachment openings 272.

In the illustrated configuration, the first attachment openings 260 are substantially opposed to one another and the second attachment openings 272 are substantially opposed to one another. The first and second attachment openings 260, 272 may be substantially semi-round for snugly receiving and engaging one of the elongated structural members 18 of the mesh 14. In the illustrated configuration, the second attachment openings 272 are oriented generally transverse to the first attachment openings 260. In this way, the conduit 200 can be secured to the intersection 22 (see FIGS. 1 and 2) of the mesh 14 with one of the elongated structural members, such as member 18a, extending through the first attachment openings 260 and the other of the elongated structural members, such as member 18b, extending through the second attachment openings 272.

Figure 9:
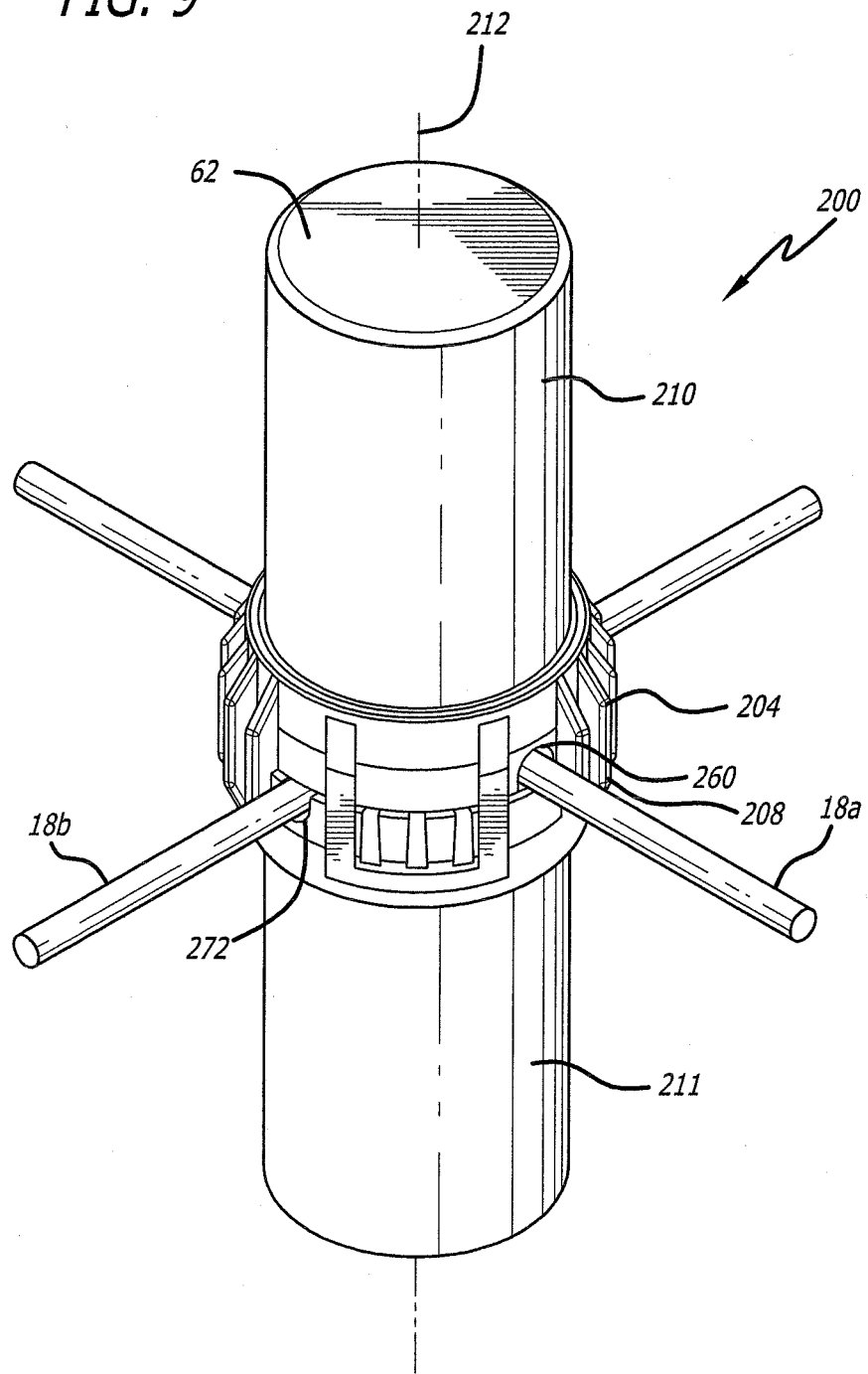
FIG. 9 is a perspective view of another embodiment of a conduit for the formation of pervious pavement.
Figure 10:
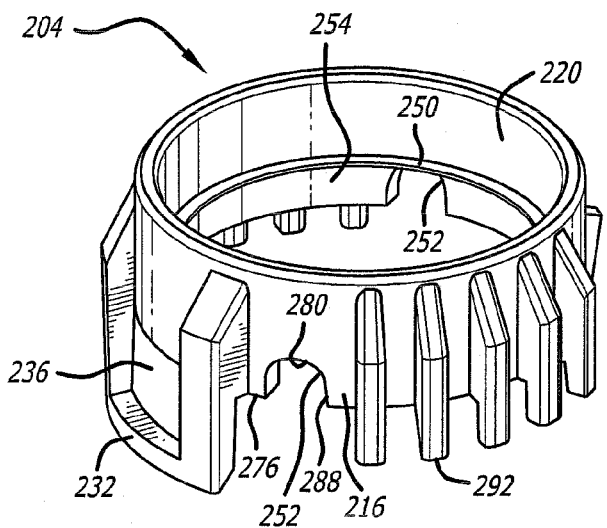
FIG. 10 is a perspective view of a first connector of the conduit of FIG. 9.
Figure 11:
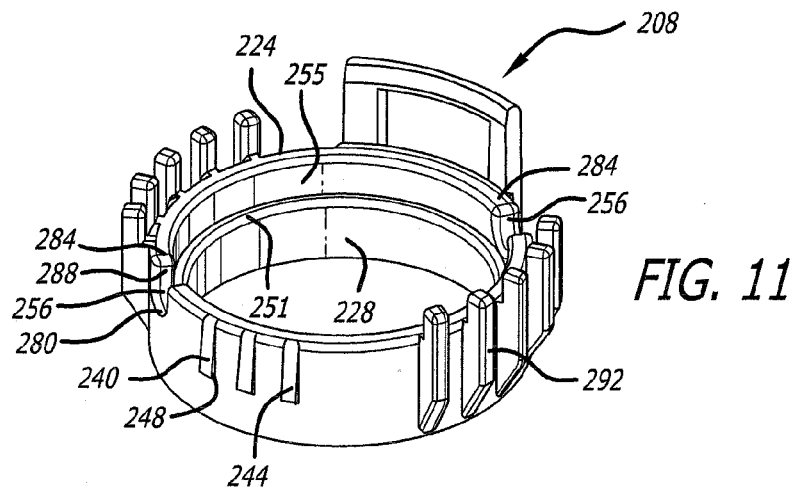
FIG. 11 is a perspective view of a second connector of the conduit of FIG. 9.
Figure 12:
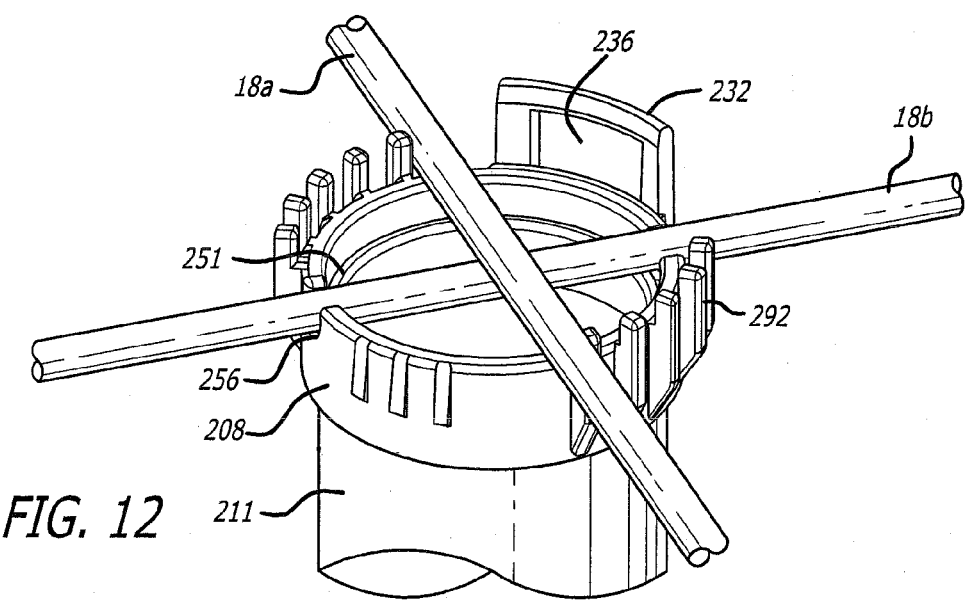
FIG. 12 is a partial perspective view of the lower portion of the conduit of FIG. 9.

As best seen in FIG. 9, the pair of first attachment openings 260 is closer to the first tube 210 than the pair of second attachment openings 272. This configuration accounts for the fact that the mesh 14 is generally constructed of interwoven elongated structural members 18, where the intersections 22 include one elongated structural member 18 extending over or under the other elongated structural member 18. To achieve the configuration in which the pair of first attachment openings 260 is closer to the first tube 210 than the pair of second attachment openings 272, the pair of first receiving notches 252 extends into the first connector coupling end 216 and the pair of second receiving notches 256 extends into the second connector end 224. More specifically, the first connector coupling end 216 includes the first end surface 276, and each of the first receiving notches 252 includes a notch depth defined as a distance from the first end surface 276 to a distal end 280 of the respective first receiving notch 252. In a corresponding manner, the second connector coupling end 224 includes the second end surface 284, and each of the second receiving notches 256 includes a notch depth defined as a distance from the second end surface 284 to the distal end 280 of the respective second receiving notches 256. The notch depths of the first and second receiving notches 252, 256 may be the same. Alternatively, the notch depth of the first receiving notches 252 may be different than the notch depths of the second receiving notches 256, allowing the use of two different sizes of structural members, for example.

In the illustrated embodiment, the first attachment openings 260 are cooperatively defined by the distal ends 280 of the first receiving notches 252 and the second end surface 284, and the second attachment openings 272 are cooperatively defined by the distal ends 280 of the second receiving notches 256 and the first end surface 276. To accommodate the round cross-section elongated structural members 18, the distal end 280 of each receiving notch is substantially arcuate, such that the resulting attachment opening 260, 272 is substantially semi-circular. It should be appreciated that the specific size, shape, and configuration of the receiving notches 252, 256 can be modified to accommodate a mesh 14 having a different configuration of structural members. However, in the illustrated embodiment, the receiving notches 252, 256 include the aforementioned arcuate distal ends 280 and sidewall portions 288 that are narrower adjacent the distal ends 280 and wider adjacent the respective first or second end surface 276, 284. The sidewall portions 288 may facilitate positioning the first and second connectors 204, 208 with respect to the elongated structural members 18 of the mesh 14 by guiding the elongated structural members toward the distal ends 280 of the notches 252, 256.

To further facilitate positioning of the first and second connectors 204, 208 on the mesh 14, one or both of the first and second connectors 204, 208 may be provided with alignment members 292 to help align at least one pair of receiving notches 152, 156 with the elongated structural members. In the illustrated configuration, alignment members 292 are provided on the first and second connectors 204, 208 and may take the form of a plurality of opposed and axially extending ribs that are located between the first and second receiving notches 252, 256. As discussed above, the first receiving notches 252 are configured to receive the upper elongated structural member 18 of a given intersection 22 by virtue of the first receiving notches 252 being located closer to the first tube 210 than the second receiving notches 258, which are configured to receive the lower elongated structural member of a given intersection 22. An installer can thus align the alignment members 292 in relation to the upper elongated structural member 18 and position the first connector 204 onto the intersection 22, which makes it easier for the installer to ensure that the first connector 204 is properly oriented such that the first receiving notches 252 are positioned to receive the upper elongated structural member 18. The alignment members 292 also assist in preventing rotation of the first and second connectors 204, 208 when they are joined.

The illustrated first and second connectors 204, 208, when connected, include an alternating arrangement of receiving notches. For example, the first connector 204 includes an arrangement of first receiving notches 252, while the second connector 208 includes an arrangement of second receiving notches 258. The arrangements of notches provide the first and second connector coupling ends 216, 224 with a crenellated structure. More specifically, the first receiving notches 252 define first connector crenellations extending around the first connector coupling end 216, and the second receiving notches 258 define second connector crenellations extending around the second connector coupling end 224. When the first and second connectors 204, 208 are joined together, the crenellated structures cooperate with the first and second end surfaces 276, 284 to capture the elongated structural members 18 at the intersections 22 of the mesh 14.

To install the conduit 200 for use in a pervious pavement application, an installer identifies an intersection 22 of the mesh 22 to which the conduit 200 is to be secured. The installer then appropriately aligns one of the first and second connectors 204, 208 with the intersection 22. Appropriate alignment involves aligning the pairs of receiving notches 252, 256 with either the upper or the lower elongated structural member 18 that defines the intersection. Although the order of installation can be reversed, by way of example only, the second connector 208 will be used as the lower portion of the conduit 200 and will be installed first. The second connector 208 with the second tube 211 installed is positioned below the intersection 22 and the pair of second receiving notches 258 is aligned with the lower elongated structural member 18. The end of the second tube 211 may then be positioned on the subgrade surface 82, which may support the mesh 14. The first connector 204 is then positioned over the intersection 22 and the first receiving notches 252 are aligned with the upper elongated structural member 18. The alignment members 292 may also facilitate proper alignment of the first and second connectors 204, 208, and prevent rotation therebetween when connected.

The first connector 204 is then moved downwardly such that the first connector coupling end 216 moves into engagement with the second connector coupling end 224. Slight misalignment between the first connector 204 and the second connector 208 may be resolved as the first connector 204 is moved downwardly and either the alignment members 292 engage one another and/or as the sidewall portions 288 of the notches 252 engage and guide the elongated structural members toward the distal ends 280 of the notches 252. In one embodiment, as the first and second connector coupling ends 216, 224 are moved into engagement, the walls 232 of the first latching structure are urged radially outwardly by the ramps 244 until the lips 248 of each tab 240 move into the openings 236, at which point the walls 232 snap radially inwardly and secure the first and second connector coupling ends 216, 224 to one another. The first tube 210 may then be inserted into the first connector 204 to complete the assembly of the conduit 200. After completing installation of as many conduits 200 as a particular application requires, subbase material 86 and/or paving material maybe poured around the conduits 200 and over the mesh 14 in the manner discussed above to complete the pervious pavement installation. In this embodiment the tubes 210, 211 are preferably standard size PVC tubing that me be precut to the desired length and press fit into the appropriate receiving section 254, 255.

Several alternative examples have been described and illustrated herein. A person of ordinary skill in the art would appreciate the features of the individual embodiments, and the possible combinations and variations of the components. A person of ordinary skill in the art would further appreciate that any of the examples could be provided in any combination with the other examples disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the word "including" as used herein is utilized in an open-ended manner.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A supporting conduit for the formation of pervious pavement, the supporting conduit comprising:
    a first connector having a first receiving section, a first connector coupling end, and a first connector distal end, the first receiving section including a first stop member, the first connector coupling end defining an opposed and generally axially extending pair of first receiving notches, the first connector coupling end also including a first latching structure, the first latching structure defining one of a male latching member and a female latching member; and
    a second connector having a second receiving section, a second connector coupling end, and a second connector distal end, the second receiving section including a second stop member, the second connector coupling end defining an opposed and generally axially extending pair of second receiving notches, the second connector coupling end also including a second latching structure, the second latching structure defining the other of a male latching member and a female latching member, wherein the first and second coupling ends are joinable to one another through engagement of the first and second latching structures, wherein when the first and second latching structures are engaged the pair of first receiving notches is substantially transverse to the pair of second receiving notches, wherein the pair of first receiving notches cooperates with the second connector to define a pair of first attachment openings, and wherein the pair of second receiving notches cooperates with the first connector to define a pair of second attachment openings.

2. The supporting conduit of claim 1, wherein the first connector and the second connector are identical in structure.

3. The supporting conduit of claim 1, wherein the second coupling end is received by the first coupling end when the first and second latching structures are engaged.

4. The supporting conduit of claim 1, further comprising first and second hollow tubes that are substantially cylindrical.

5. The supporting conduit of claim 4, wherein an end of the first hollow tube is received by the first receiving section and engaged by the first stop member, and wherein an end of the second hollow tube is received by the second receiving section and engaged by the second stop member.

6. The supporting conduit of claim 1, wherein the pair of first attachment openings is closer to the first connector distal end than the pair of second attachment openings.

7. The supporting conduit of claim 1, wherein the pair of second attachment openings is closer to the second connector distal end than the pair of first attachment openings.

8. The supporting conduit of claim 1, wherein the first connector coupling end includes a first end surface, and wherein each of the first receiving notches includes a notch depth defined as a distance from the first end surface to a distal end of the respective notch, wherein the notch depth of the first receiving notches is greater than the notch depth of the third receiving notches.

9. The supporting conduit of claim 8, wherein the second coupling end includes a second end surface, and wherein each of the second receiving notches includes a notch depth defined as a distance from the second end surface to a distal end of the respective notch, wherein the notch depth of the second receiving notches is substantially equal to the notch depth of the first receiving notches.

10. The supporting conduit of claim 9, wherein each of the first receiving notches and the second receiving notches includes a distal end, wherein each of the first attachment openings is cooperatively defined by the distal end of a first receiving notch and the second end surface, and wherein each of the second attachment openings is cooperatively defined by the distal end of a second receiving notch and the first end surface.

11. The supporting conduit of claim 10, wherein each distal end is substantially arcuate, and wherein each of the first and second attachment openings is substantially semi-circular.

12. The supporting conduit of claim 1, wherein the male latching members of the first and second latching structures include alignment members oriented substantially opposite the female latching members of the first and second latching structures respectively.

13. The supporting conduit of claim 1, wherein the female latching member includes an axially extending wall defining an opening, wherein the male latching member includes an axially extending tab defining a ramp and having an outwardly extending lip, and wherein as the first and second latching structures are engaged the ramp deflects the wall outwardly until the ramp is received within the opening and the wall snaps over the lip, thereby coupling the second connector to the first connector.

14. A conduit for supporting a reinforcing mesh and in a pervious pavement installation, the conduit comprising:
    a first connector including a first connector coupling end defining a first end surface and a pair of first receiving notches, the first receiving notches oriented substantially opposite each other and cooperating to define first connector crenellations extending around the first connector coupling end; and a second connector including a second connector coupling end engageable with the first connector coupling end to couple the second connector to the first connector, the second connector coupling end defining a second end surface and a pair of second receiving notches, the second receiving notches oriented substantially opposite each other and cooperating to define second connector crenellations extending around the second connector coupling end, wherein when the second connector is coupled to the first connector, and wherein the first and second connectors are substantially identical in structure, the first receiving notches cooperate with the second end surface to define a pair of first attachment openings, and the second receiving notches cooperate with the first end surface to define a pair of second attachment openings.

15. The conduit of claim 14, wherein the first connector includes a first hollow tube having a first tube distal end opposite the first connector coupling end, and wherein the pair of first attachment openings is closer to the first tube distal end than the pair of second attachment openings.

16. The conduit of claim 14, wherein a first tube proximate end of the hollow tube engages a first stop member of the first connector, wherein the first stop member is a circumferential ridge, wherein the circumferential ridge separates the proximate end of the hollow tube from the first attachment openings.

17. The conduit of claim 14, wherein the first connector includes first latching structure defining one of a male latching member and a female latching member, wherein the second connector includes second latching structure defining the other of a male latching member and a female latching member, and wherein the first and second latching structures are engageable with one another to couple the first connector and the second connector.

18. The conduit of claim 17, wherein the first connector coupling end includes at least one first connector securement tab defined between the first receiving notches, wherein the at least one first connector securement tab includes an opening that defines the female latching member.

19. The conduit of claim 18, wherein the second connector coupling end includes at least one second connector securement tab defined between the second receiving notches, and wherein the at least one second connector securement tab includes a lip comprising the male latching member and configured for snap-fit engagement within the opening in the at least one first connector securement tab.

20. A supporting conduit for the formation of pervious pavement, the supporting conduit comprising: a first connector having a first receiving section, a first connector coupling end opposite the first receiving section, and a first connector distal end at an opening to the first receiving section, the first receiving section including a first stop member and adapted to receive and secure a hollow conduit and the first stop member adapted to provide a stop for the hollow conduit in the first connector, the first connector coupling end defining an opposed and generally axially extending pair of first receiving notches, the first connector coupling end also including a first latching structure, the first latching structure defining one of a male latching member and a female latching member, wherein the first connector is adapted to be secured to another identical first connector to form the supporting conduit having offset pairs of receiving notches.

* * * * *